United States Patent
Link

(10) Patent No.: US 6,789,350 B1
(45) Date of Patent: Sep. 14, 2004

(54) TOLLING ASSEMBLY WITH HYDRODYNAMIC PLANER BOARD, STRIKE INDICATOR, NIGHT LIGHTING, AND NOVEL FISHING LINE RELEASE

(76) Inventor: Kevin J. Link, 1298 Electric Ave., Lackawanna, NY (US) 14218

( * ) Notice: Subject to any disclaimer, the term of this patent is extended or adjusted under 35 U.S.C. 154(b) by 0 days.

(21) Appl. No.: 10/431,827

(22) Filed: May 8, 2003

(51) Int. Cl.⁷ .............................................. A01K 91/00
(52) U.S. Cl. ........................... 43/43.13; 43/17; 43/17.5
(58) Field of Search ............................ 43/43.13, 43.12, 43/17, 17.5

(56) References Cited

U.S. PATENT DOCUMENTS

| | | | | |
|---|---|---|---|---|
| 2,901,857 A | * | 9/1959 | Lockert | 43/43.13 |
| 3,067,539 A | * | 12/1962 | Black | 43/43.13 |
| D196,888 S | * | 11/1963 | Pilsner | D10/109 |
| 3,613,290 A | * | 10/1971 | Louthan | 43/43.13 |
| 3,973,347 A | * | 8/1976 | Kearney | 43/17 |
| 4,028,840 A | * | 6/1977 | Wille | 43/43.13 |
| 4,524,538 A | * | 6/1985 | Halvorsen | 43/43.13 |
| 4,700,505 A | | 10/1987 | Weber | |
| 4,745,702 A | * | 5/1988 | Koch | 43/43.13 |
| 4,920,689 A | * | 5/1990 | Anderson | 43/43.13 |
| 4,980,986 A | * | 1/1991 | Harper | 43/17 |
| 5,170,581 A | * | 12/1992 | Lyons | 43/43.12 |
| 5,412,897 A | * | 5/1995 | Smith | 43/4 |
| 5,548,919 A | * | 8/1996 | Hicks | 43/43.13 |
| 5,826,365 A | | 10/1998 | Stroobants | |
| 5,867,933 A | | 2/1999 | Walker | |
| 5,875,583 A | | 3/1999 | Church | |
| 5,898,372 A | * | 4/1999 | Johnson et al. | 340/573.2 |
| 5,921,015 A | | 7/1999 | Newell et al. | |
| 6,055,765 A | | 5/2000 | Ruppa | |
| 6,119,389 A | * | 9/2000 | Walker | 43/43.13 |
| 6,256,924 B1 | | 7/2001 | Walker | |

* cited by examiner

Primary Examiner—Kurt Rowan
Assistant Examiner—Joan M. Olszewski
(74) Attorney, Agent, or Firm—Patricia M. Constanzo

(57) ABSTRACT

A trolling planer board made of lightweight translucent material has a continuous light source for night fishing and a day or night easily perceptible strike indicator. The light, indicator, and their power supply are housed in a watertight compartment away from the elements and fishing lines. The strike indicator may comprise a blinking light, a strobe light, a sound, or any other alerting mechanism. Fishing line releases comprise only three moldable pieces, made of weather impervious material and can be used to maintain a hold on the fishing line or to release it, as desired. The planer, made of weather impervious material and having no exposed accessory parts that are sensitive to the elements, can be used in fresh or salt water. The planer's hydrodynamic design eliminates the need for planning board rods and heavy test lines and the weight of the power supply eliminates any need for additional weights.

15 Claims, 11 Drawing Sheets

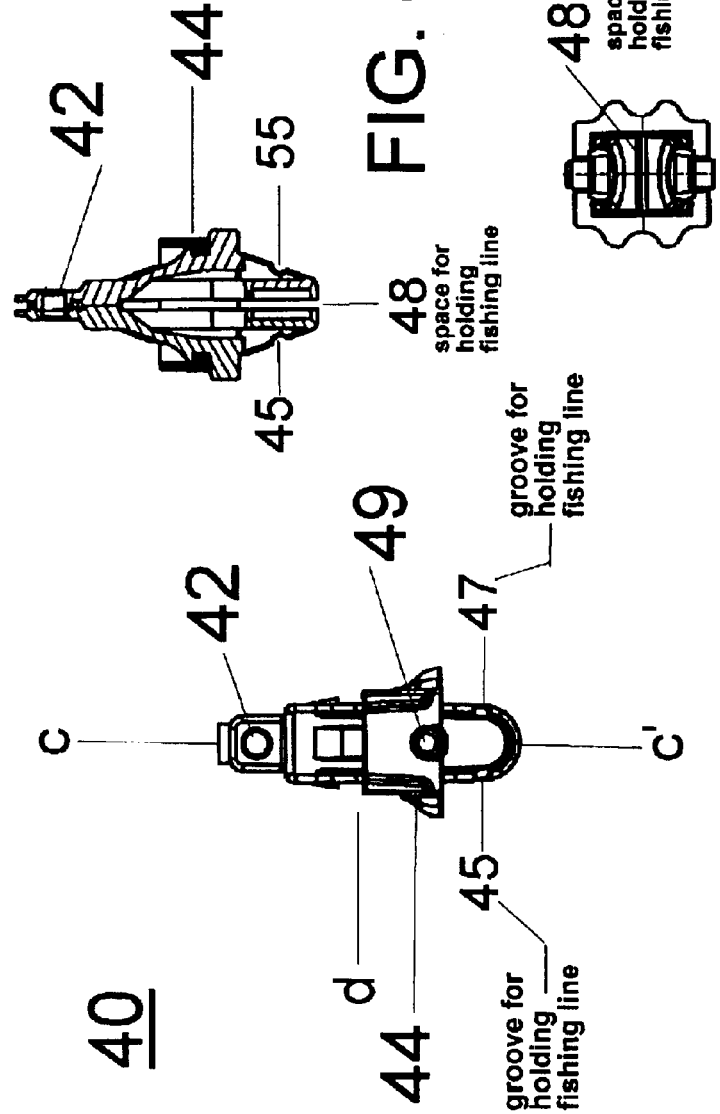

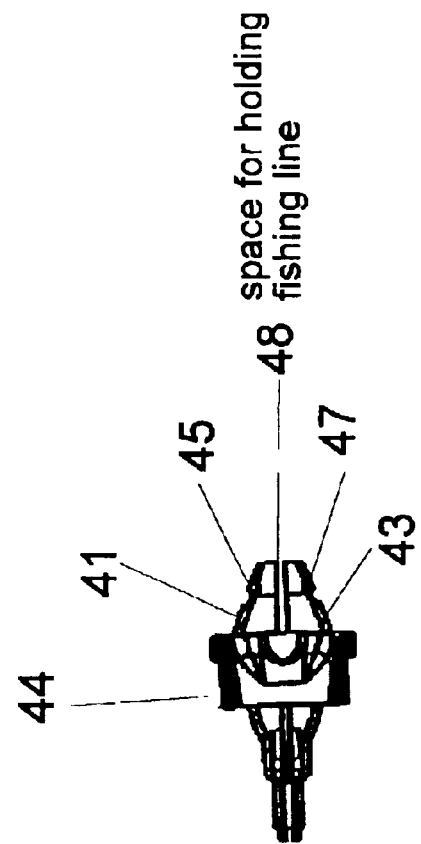

US 6,789,350 B1

TOLLING ASSEMBLY WITH HYDRODYNAMIC PLANER BOARD, STRIKE INDICATOR, NIGHT LIGHTING, AND NOVEL FISHING LINE RELEASE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE OR A COMPUTER PROGRAM LISTING COMPACT DISK APPENDIX

Not Applicable

BACKGROUND OF THE INVENTION

The present invention relates generally to the sport of fishing and, particularly, to troll fishing using planer boards.

The background information discussed below is presented to better illustrate the novelty of the present invention. This background information is not admitted prior art.

To be successful at fishing, a fisherman must understand what motivates a fish to "bite." In other words, a fisherman must know what stimuli will induce a fish into attacking its prey. Carnivorous fish stalk their prey as it moves through the water. That is, carnivorous fish strike at moving targets. So, to capture a carnivorous fish, a fisherman should provide for the bait to move through the water. This frequently is accomplished by fishing from a moving boat. The boat, along with its noisy engine, however, often "spooks" the fish. In fact, many fish species found in shallow waters routinely move away from a boat's path of travel. To overcome this problem, fishermen often use planer boards.

There are two types of planer boards that are used for trolling. One is used only for deep water fishing. The other is used for fishing in shallow water or where fish are feeding near the surface and is the type of planer under consideration here. This type of board is often referred to as a "sideplaner" as it floats on the water's surface generally parallel to and at a predetermined distance from the side of a boat and is frequently used in salmon and trout trolling. Sideplaners are conventionally long plastic or wooden surface-running boards. Fishermen like to use the sideplaners as they make the presentation of the bait to the fish much more versatile than when a fishing line is simply run out behind a boat.

Sideplaners can be attached directly to the fishing boat using a non-fishing line. In this case the fishing line or lines are attached to the non-fishing line at predetermined positions between the boat and the planer. This type of sideplaner is usually used when there is more than one fisherperson on the boat or when one person wants to fish with multiple lines.

Multiple sideplaners can be attached to a boat. By adjusting the lengths of the non-fishing line that is tethering one or several planers to the boat, a number of planers can run along one or both sides of a boat.

A smaller version sideplaner is attached directly to the fishing line. This planer has a strike release that releases the planer from the fishing line when a fish strikes.

The proper distance for a planer to be from the side of boat depends on several factors, which include how clear the water is, the shallowness of the water, and how other boats are in the vicinity. Most often, tolling line lengths are of about 70 feet, but lengths of 200 feet are not uncommon.

During daylight, a fisherperson has no difficulty keeping track of a planer's position because the planer floats on the water's surface. When fishing at night, however, seeing the planer, and knowing when a fish has struck, is problematic. It is, thus, clearly apparent that there is a need for a planer with a strike indicator that will alert the fisher people to the fact that a fish is striking.

There have been a few attempts at making planers more visible. Some planers have parts painted with a reflective paint, but this only makes the planer more visible during day light hours, at the time when there is little problem keeping the planer in sight. There have been only a few attempts at providing a planer with a light indicator, but all have serious drawbacks.

One attempt offers a planer with a lighting system that is based on a rather complex electronic circuit. The circuit comprises a fishing line release mechanism, a cam that is activated by the fishing line release mechanism, a spring that is activated by the cam, and a contact that is activated by the spring. A light is positioned on a first surface of the planer that also holds the fishing line release mechanism, while the cam and the spring are on a second surface, which is perpendicular to the first surface. On the second surface there is another electrical contact which is positioned to overhang off of the second surface over the third surface that is opposite to the first surface. This means that the electricity needed to power the light has to travel from the battery located on the first surface, across the second surface to the closed contact point, then back across the second surface to the light on the first surface. In addition to a light indicator, this planer also offers a flag strike indicator. The flag is activated to spring up from its closed position at the same time that the light is activated. One of the major problems of this apparatus is that its battery, light, wiring, fishing line release, cam, two springs (one in the light circuit and one that acts to uplift the flag), and the contact are attached to the outside of the planer. This means that all of these pieces and the wiring are subject to corrosion, especially if the planer is used in salt water. Even if the water body is fresh water, corrosion rates are accelerated when the part to be corroded is in water. Another concern to fisher people is that all of these component parts are projecting out from three of the surfaces of the planer presenting multiple possibilities for the fishing line to become tangled with the projecting parts. The complexity of this system indicates a high manufacturing cost and fairly easy breakage of the many delicate parts. Undoubtedly, what is sorely needed is a planar that, while providing for a light and a strike indicator, has no electrical wiring or connections that are exposed to the elements, especially to water. What is equally sorely needed is a planer with a minimum amount of parts projecting from the surface to minimize the threat of a fishing line becoming tangled with the projecting parts.

A sideplaner with a light powered from the power system of the boat has been suggested. This envisioned system, however, would suffer from the same problems discussed above. To supply power to the light on the planer from the boat would require electrical wiring that would either have to replace the line that holds the planer to the boat, i.e., wiring that could both provide electricity and hold the planer to the boat, or wiring that would accompany the non-fishing line. The wiring would be exposed to the elements and to the damage presented by them, as well as by the strain the wires can be expected to encounter while a fisherman is bringing in his fish, and also would pose a tangle hazard to the fishing line. Additionally, with these planers the light is powered only when a fish is striking. In other words, if the planer were to be used for night fishing, there is no way to track the position of the planer, except during the time a fish strikes. It is apparent that there is a long-felt need for a planer that can be kept lighted while fishing and yet, additionally, provides for strike indication during the day and at night.

Accordingly, it would be a significant improvement in the art to provide a side planer that provided all the advantages currently provided by a planer and would also comprise a steady light to indicate the position of the planer in addition to a strike indicator to signal fisher people when a fish took the bait, wherein the electrical system of the planer would be safely stored inside the planer's water-tight shell so as not to be exposed to chemical or physical weathering processes and so as not to entangle fishing line. Such a planer should be light-weight, to maintain its position above the surface of the water, and should have as few metal parts as possible on the outside of the planer to avoid the effects of corrosion and any interruption of the power supply. The ideal planer would be made of as few parts as possible to reduce the cost of manufacturing and the hazards of breakage.

SUMMARY

The present invention satisfies the urgent need in the art for a trolling assembly comprising a lighted planer board with strike indicator that offers the highest level of bait presentation while troll fishing in shallow water. The trolling assembly of the present invention comprises a planer board comprising an enclosed, hollow casing having at least one interior compartment. A first compartment is a watertight compartment fashioned to house the power supply, lighting system, strike indicator, and related electrical connections to keep all of the power-related elements sheltered from the risks of damage by the elements and, additionally, to keep the electrical components away from the fishing line, thus eliminating potential tangling hazards. At least one of the lights that is housed in the water-tight compartment may be set to emit continuous light when night fishing. The strike indicator, also housed in the water-tight compartment, is designed to alert fisher people when a fish has accepted the bait, regardless of when one is fishing, day or night.

The novel planer board casing has an hydrodynamic tapered leading edge and an hydrodynamic curved edge between the inboard surface of the planer and the longitudinal lower surface. This curved edge directs the water flow beneath the board which reduces resistance between board and water and, thus, eliminates the need for heavy fishing equipment such as planning board rods and heavy test lines. Additionally, the trolling assembly, described herein, is lightweight, of few parts, and has no metal parts or other easily weathered parts exposed to the elements. The planar casing, made of light weight material is buoyant, but, if desired, additional buoyancy is achieved by placing a buoyant object in a second compartment in the hollow space of the board casing.

The trolling assembly is towed by the fishing line and is held in a towing mode by one of the line releases, If it is desired to keep the trolling assembly securely attached to the boat while playing a fish, the fishing line may be fixedly secured to the fishing line release, or if it is desired to have the trolling assembly completely detach from the fishing line while a fish is being played, the fishing line may be secured to the release in a manner that will permit the planer to be released. The fishing line releases used by the planer each comprise only three parts that can be economically produced by many methods, including injection molding, and have no metal parts.

In a preferred embodiment, the trolling assembly of the present invention comprises:

i) a buoyant planer board having a water-tight compartment;

ii) at least one fishing line release extending from the planer board for the purpose of holding a fishing line;

iii) an easily perceptible strike indicator integral with the planer board;

iv) a power source housed in the water-tight compartment providing power to said strike indicator, and v) an activation means operatively connected to the fishing line and the power source for the purpose of activating the strike indicator when a fish strikes.

The activation means comprises a plunger having a first end and a second end with the first end of the plunger projecting out from the water-tight compartment proximate to the fishing line release and operatively connected to a fishing line, and with the second end of the plunger projecting into the water-tight compartment of the planer;

iv) a first electrical contact;

v) a second electrical contact;

vi) a biasing means operatively connected to the plunger to maintain the first and second electrical contacts apart, wherein when a fish strikes the fishing line release releases the fishing line exerting a pulling pressure on the plunger to work against the biasing means causing the first and second electrical contacts to connect and activating the strike indicator.

The trolling assembly may further comprising a second fishing line release extending from the planer board for positively retaining the trolling assembly to a fishing boat by its connection to the fishing line.

In one preferred embodiment, the body of the planer board comprises a hollow casing in which there is located at least one compartment that is a water-tight compartment. The continuous light source, the strike indicator, and the related power supply are housed in this water-tight compartment. Thus, in this embodiment, the planer board is made from a translucent material so that the light emanating from inside the water-tight compartment can be seen easily from some distance away. The continuous light source, useful when night fishing, may comprise one or several light sources connected in parallel, for providing continuously bright light.

Various embodiments of the trolling assembly may have strike indicators comprising a blinking light, a audio device, a strobe light, or any other means to indicate that a fish has struck.

Additionally, the planer board of the trolling assembly comprises:

i) an inboard surface, and ii) a longitudinal lower surface where the edge that is formed by the conjunction of the inboard surface and the longitudinal lower surface is shaped to a hydrodynamic curved edge to direct the water flow to beneath the board.

Another embodiment of the planar board of the trolling assembly further comprises a second compartment located in the hollow space of the planar board casing which contains a buoyant object capable of increasing the buoyancy of the planar board where such an object may be a light-weight, sturdy to the elements, foam block.

Still yet another embodiment comprises a fin on the inboard surface of the planar board for directing the movement of the board. The fin may be integrally molded with the planer board or it may be fixedly attached to the planer board.

The fishing line releases of the trolling assembly comprise:

i) a first clamping jaw having a distal and proximal end and a first and second surface;

ii) a second clamping jaw having a distal and proximal end and a first and second surface, and iii) a moveable clamping collar to fit about the first and second clamping jaws; wherein the first clamping jaw and the second clamping jaw are coupled at their respective distal ends to effectively bias their proximal ends apart from each other so as to provide a space into which a fishing line is threaded, and where the collar fits about the two parts to counter-bias the proximal ends toward each other to reversibly hold the fishing line. The fishing line release is preferably made of a non-metal material and may be manufactured by a molding process.

Still other benefits and advantages of this invention will become apparent to those skilled in the art upon reading and understanding the following detailed specification and related drawings.

BRIEF DESCRIPTION OF THE DRAWINGS

In order that these and other objects, features, and advantages of the present invention may be more fully comprehended, the invention will now be described, by way of example, with reference to the accompanying drawings, wherein like reference characters indicate like parts throughout the several figures, and in which:

FIG. 4b is a plan view of the release.

FIG. 4c is a cross-sectional view of the release taken along c–c'.

FIG. 4d is a plan view of the releases looking down c'.

FIG. 4e is a plan view of the release shown in FIG. 4b looking down the "d" direction.

DEFINITION

Figure 1:
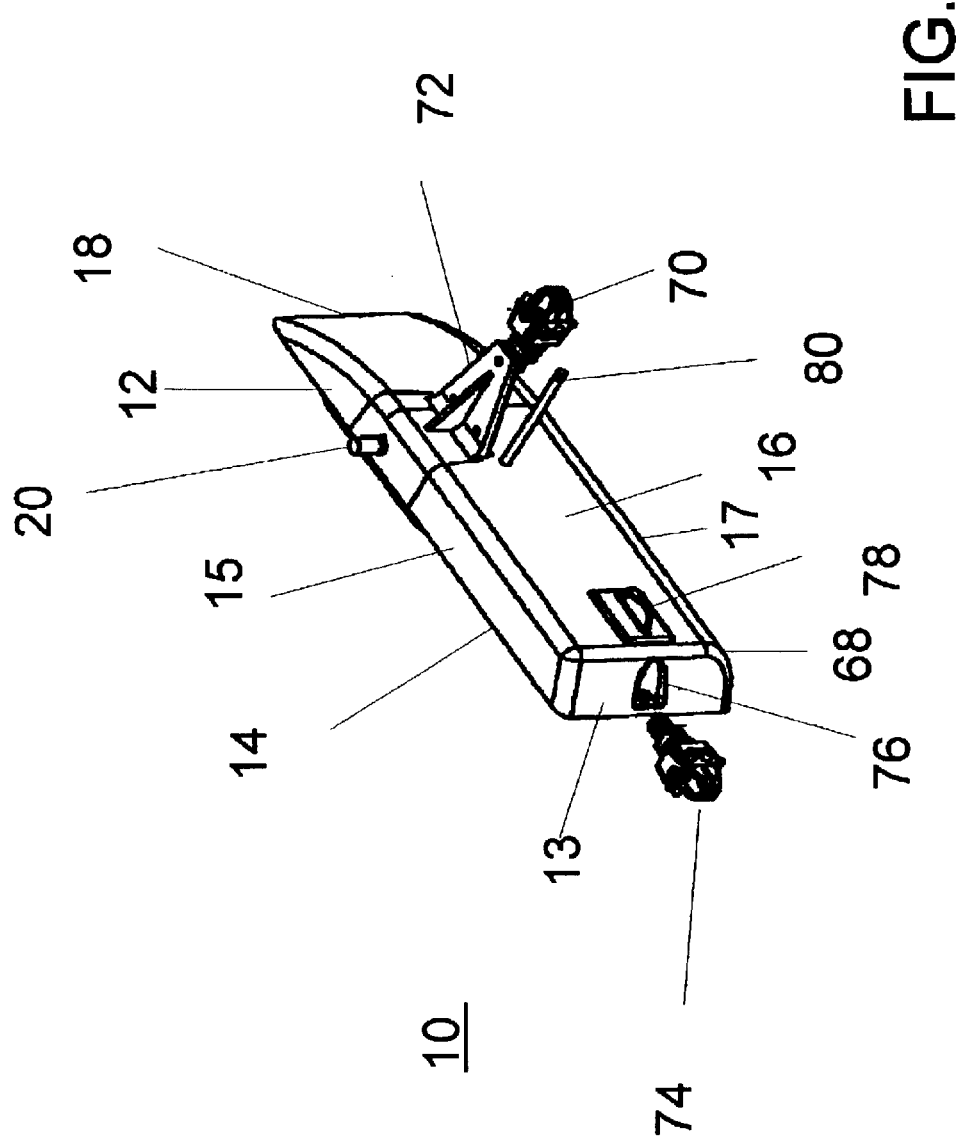
FIG. 1 is a perspective view of the inboard side of a trolling assembly made in accordance with this invention.

"Side-planer" a planer that is drawn through the water at the side of a moving boat.

"Front side of planer" refers herein to the side of the planer from which plunger 80 protrudes, also referred to as the "inboard side".

"Rear side of planer" refers herein to the side of the planer that is opposite the front side of planer, also referred to as the "outboard side".

"Distal end" in reference to the clamping jaws 41 and 43, distal end, as used herein, refers to those ends that are opposite to the ends of the clamping jaws in which the fishing line is held.

"Proximal end" in reference to the clamping jaws 41 and 43, as used herein, refers to those ends of the clamping jaws into which the fishing line is inserted.

A LIST OF THE REFERENCE NUMBERS AND RELATED PARTS OF THE INVENTION

10 Trolling assembly
12 Hollow case, or casing, of planer board of trolling assembly 10
13 Backend surface
14 Back or outboard surface of planer board casing 12
15 Longitudinal upper surface
16 Front or inboard surface of planer board casing 12
17 Longitudinal lower surface
18 Tapered end of planer board
20 Light switch
22 Water-tight cover for battery and lights compartment
24 Handle for lifting water-tight cover 22.
25 Compartment that may be used for additional buoyant material
26 Means to attach cover 22 to outboard surface 14 of case 12
27 Separating wall between water-tight compartment 30 and compartment 25
30 Water-tight compartment for batteries and lights
32 Batteries
34 Water-tight seals
36 Sealing rim
38 Spring
40 Release (not attached to planer)
41 First clamping jaw of release 40
42 Attachment member of release 40 with spring action tab closure
43 Second clamping jaw of release 40
44 Moveable clamping collar of release 40
45 First groove; located on top tab-like half 41 of release 40 for holding fishing line
47 Second groove; located on top tab-like half 41 of release 40 for holding fishing line
48 Space between first clamping jaw 41 of release 40 and second clamping jaw 43 of release 40 through which a fishing line is threaded
49 Button stop
50 Lightweight buoyancy insert
52 First contact
54 Second contact
55 Third groove; located on bottom tab-like half 47 of release 40 for holding fishing line
57 Fourth groove; located on bottom tab-like half 47 of release 40 for holding fishing line
60 Board to which lights are attached
62 Blinking light
64 Non-blinking lights
68 Curved edge of planer board
70 First line release
72 Linking member for linking first line release 70 to planer
74 Second line release 76 Linking member for linking second line release to planer 74
78 Fin for guiding fishing line
80 Plunger
82 Fitting for plunger 80
84 Crochet-like hook of plunger to hold fishing line It should be understood that the drawings are not necessarily to scale. In certain instances, details which are not necessary for an understanding of the present invention or which render other details difficult to perceive may have been omitted. It should be understood, of course, that the invention is not limited to the particular embodiments illustrated herein, but encompasses many embodiments as are discussed throughout the specification.

DETAILED DESCRIPTION

Referring now particularly to the drawings, FIG. 1 presents a perspective view of trolling assembly 10, which is to be understood to be an exemplary embodiment of this invention, and demonstrates how the above mentioned disadvantages have been overcome. It should be noted that the disclosed invention is disposed to embodiments in various sizes, shapes, and forms. Therefore, the embodiments described herein are provided with the understanding that the present disclosure is intended as illustrative and is not intended to limit the invention to the embodiments described herein.

FIG. 1 illustrates an embodiment of trolling assembly 10 for towing by a fishing line from the port side of a fishing boat (not shown). It should be understood that another embodiment for towing by a fishing line from the starboard side of a boat is the mirror image of the embodiment shown. Planar board casing 12 of trolling assembly 10, has spaced, generally parallel, inboard and outboard surfaces 16 and 14, respectively. Inboard surface 16 and outboard surface 14 are connected by longitudinal capping surface 15, longitudinal capping surface 17, and back end surface 13. Inboard surface 16 tapers to leading forward edge, or end, 18 until it joins (meets) outboard surface 14. Planer casing 12 is generally hollow and will be discussed in more detail below. Tapered leading edge 18 of casing 12 will always be facing inboard, tapering from the outboard body wall 16 toward edge 18. This provides a positive attack angle carrying the trolling assembly away from the lateral side of the boat as the assembly is pulled by the boat through the water.

Also shown in FIG. 1 is first fishing line release 70 linked to planer board inboard surface 16 by linking member 72 about mid-height of inboard surface 16 and proximate to tapered leading edge 18. Second fishing line release 74, located at mid-height back end surface 13, is linked to the planer board by linking member 76. Further discussion of the structure and use of fishing line releases 70 and 74 is given below in conjunction with FIGS. 4a–4e. Briefly, a fishing line is connected to fishing line release 70 which may be used to hold the trolling assembly to the boat while a fish is played or to release the trolling assembly from the boat as a fish is played, as desired. After attaching the fishing line to fishing line release 74, it is then threaded through plunger 80, which can be seen in FIGS. 1, 2, and 3 located proximate to fishing release 70. The function of plunger 80 to activate the strike indicator when a fish strikes will be explained in detail below. From plunger 80 the fishing line is then attached to release 74 which will release the line when a fish strikes.

Light switch 20 is shown positioned on longitudinal cap surface 15 to provide for at least one light (which light is housed in water-tight compartment 30) to be illuminated while fishing in the dark so that the location trolling assembly 10 can be easily seen.

Also illustrated in FIG. 1 is fin 78 integrally formed with planer casing 12 during the molding process. It is to be understood, however, that fin 78 can be affixed to casing 12 in any other manner that will accomplish a fixation. In the embodiment shown, fin 78 projects perpendicularly from inboard surface 16 to enhance the stability of planer board 10, but may be formed at any other angle to surface 16 to achieve a desired effect.

Figure 2:
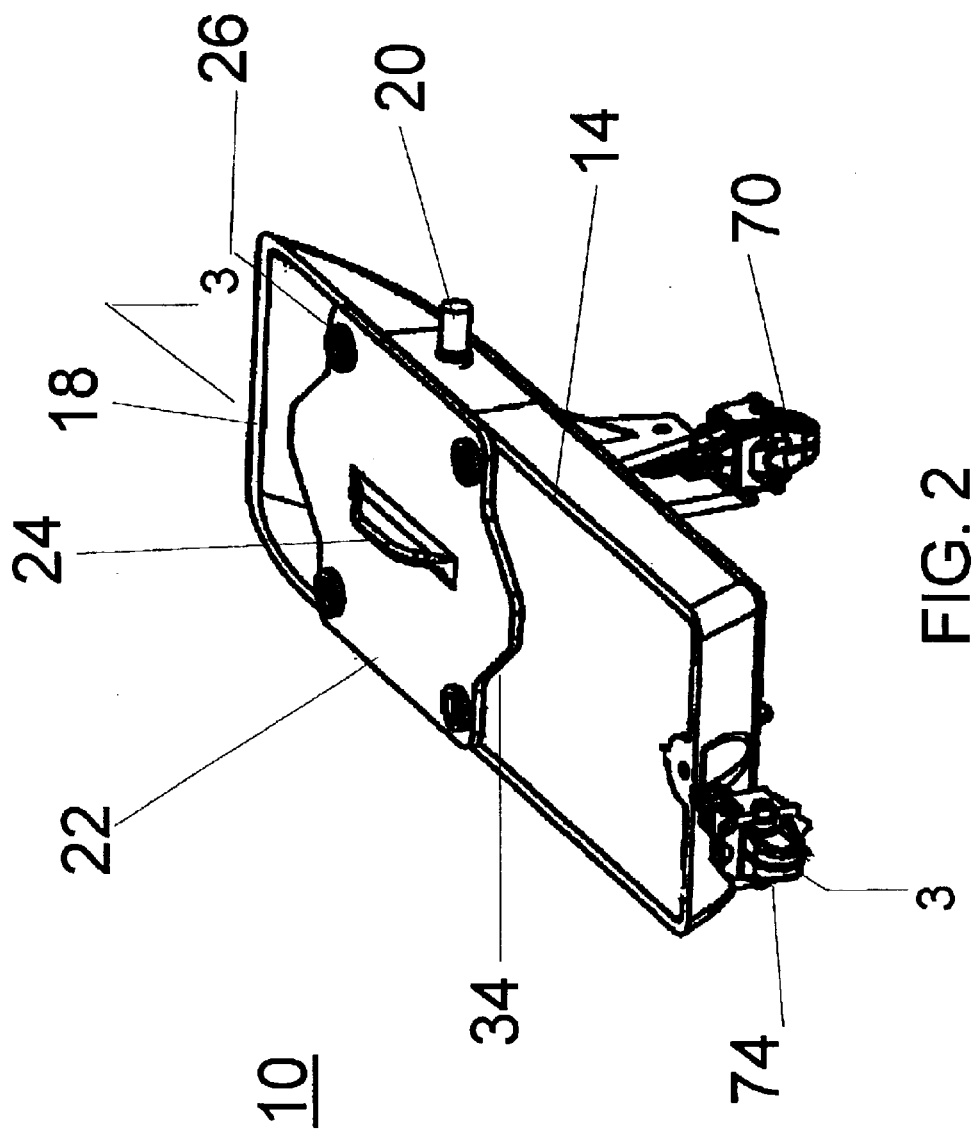
FIG. 2 is a perspective view of the outboard side of the trolling assembly as shown in FIG. 1.
Figure 3:
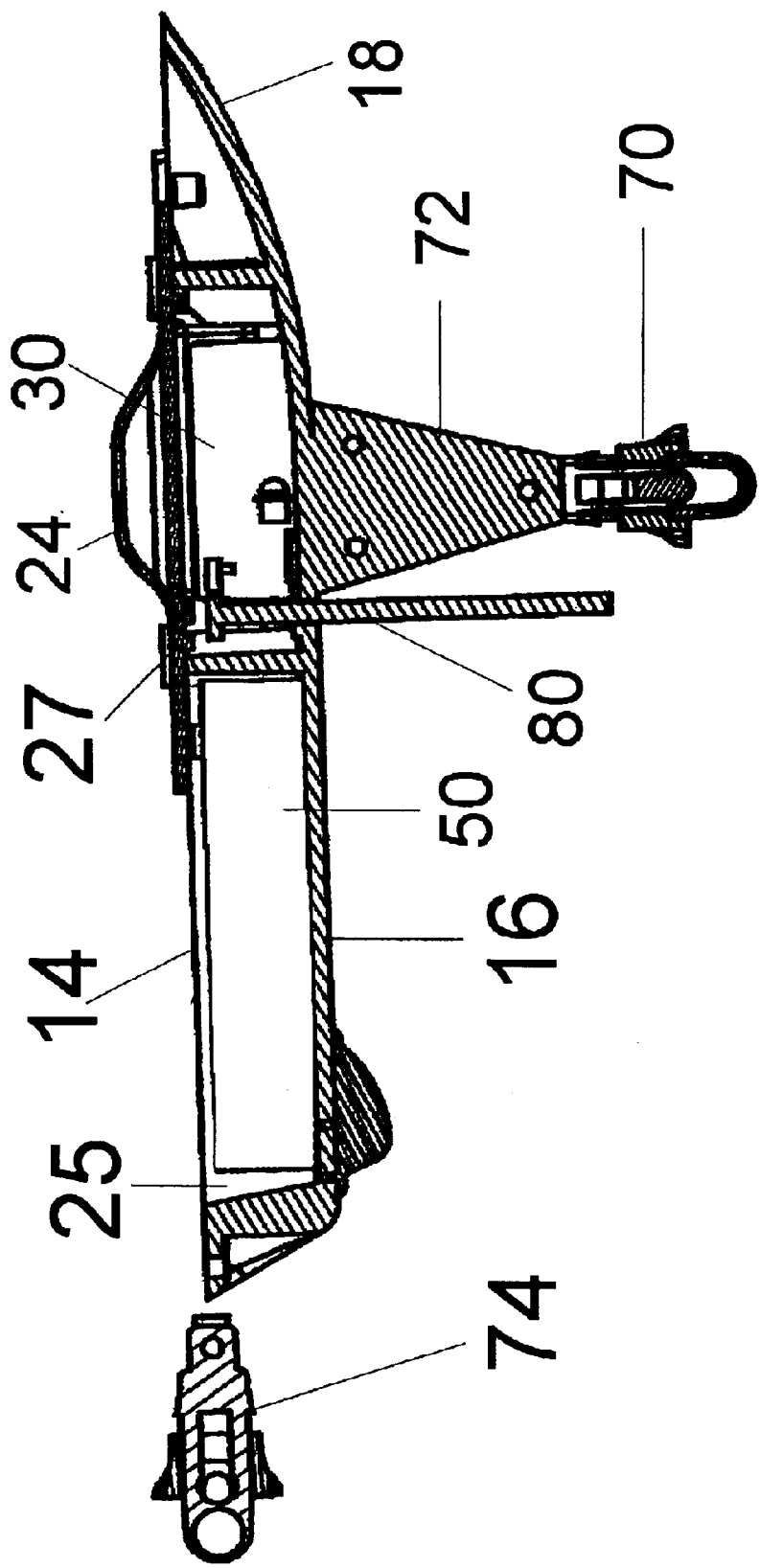
FIG. 3 is a cross-sectional plan view taken along 3—3 of FIG. 2

FIG. 2, a perspective view of the planer board's outboard side 14, shows water-tight cover 22 covering water-tight compartment 30 (shown in FIG. 3). Handle 24 provides for sure grasping of water-tight cover 22 when it is to be positioned over the water-tight compartment or when removing the cover. Water-tight cover 22 is fixed firmly over the water-tight compartment using water-tight seal 34 and four fasteners 26.

FIG. 3, a cross-sectional view of planer assembly 10 taken along 3—3 of FIG. 2, shows the two compartments located in the hollow space of casing 12, compartment 25 and water-tight compartment 30 separated by separating wall 27. Compartment 25 may be used to hold a lightweight buoyancy insert, such as foam block 50. In the embodiment shown, casing 12 is formed by injection molding and, thus, being hollow, is naturally buoyant. However, the addition of a buoyancy insert, such as foam block 50, ensures that trolling assembly 10 is maintained in a vertical position while in the water. The weight provided by batteries 32 (see FIG. 5) housed in water-tight compartment 30 provide for trolling assembly 10 to be maintained in a stable, vertical position. Because of the weight provided by batteries 32 no extra weights are normally required.

Figure 4A:
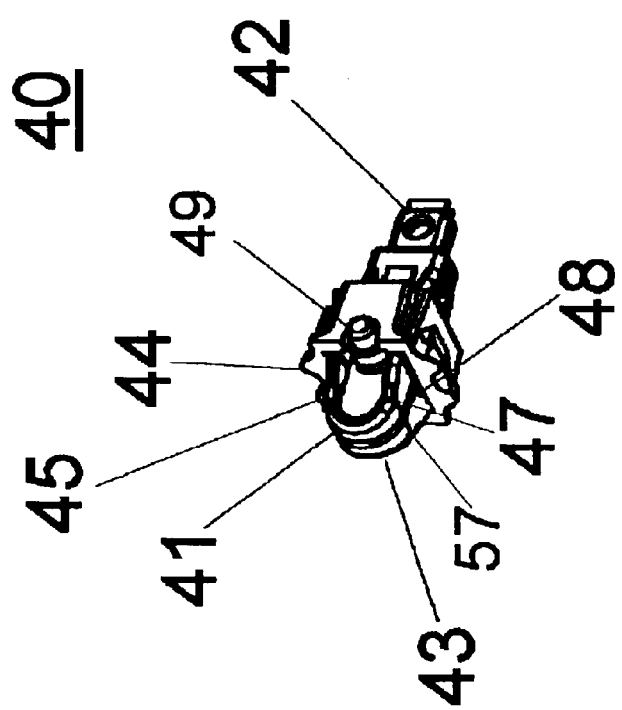
FIG. 4a is a perspective view of either of the two releases shown in FIG. 1.
Figure 8:
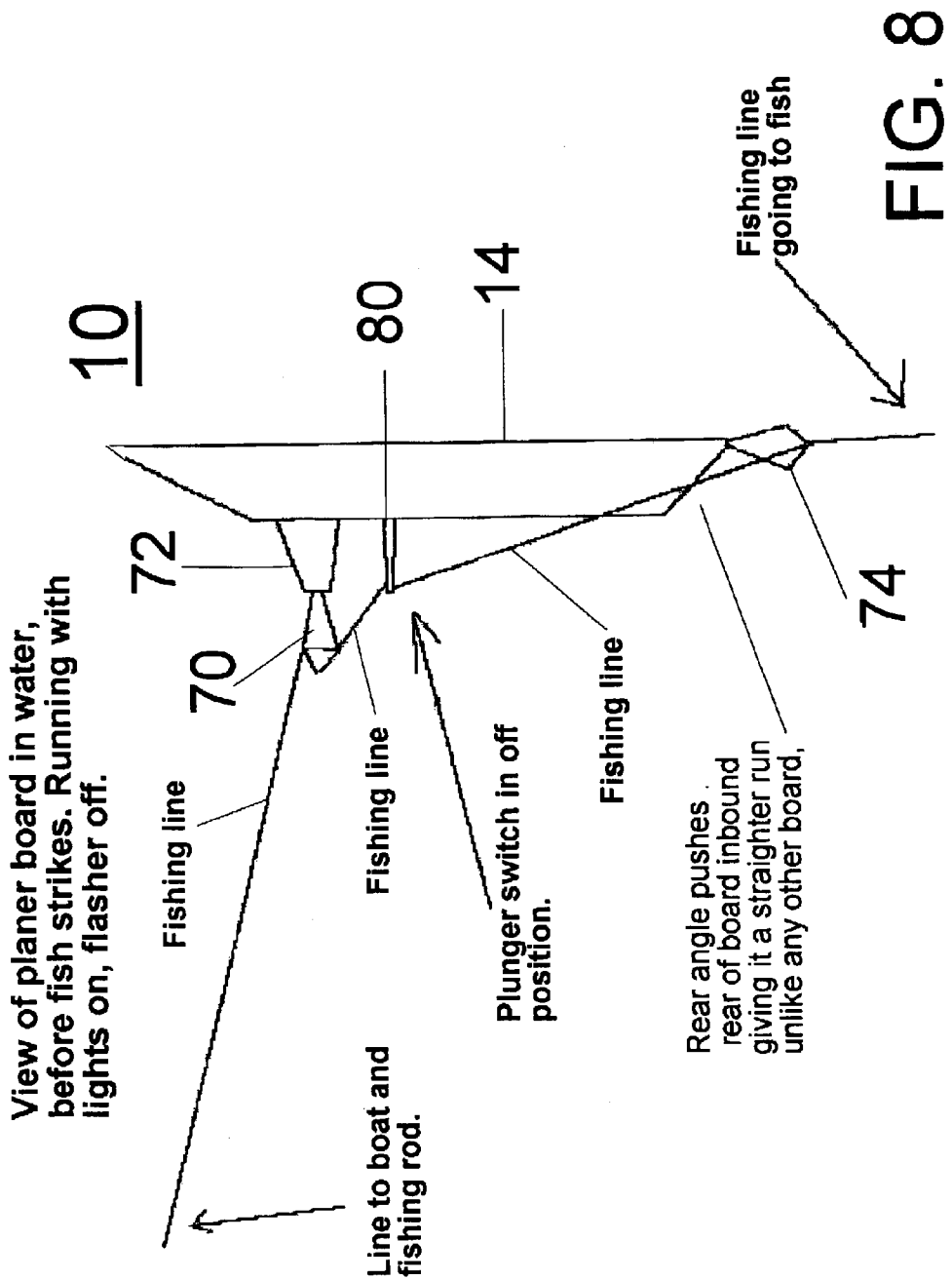
FIG. 8 is a schematic plan view of a fishing line attached to the planer before a fish strikes.
Figure 9:
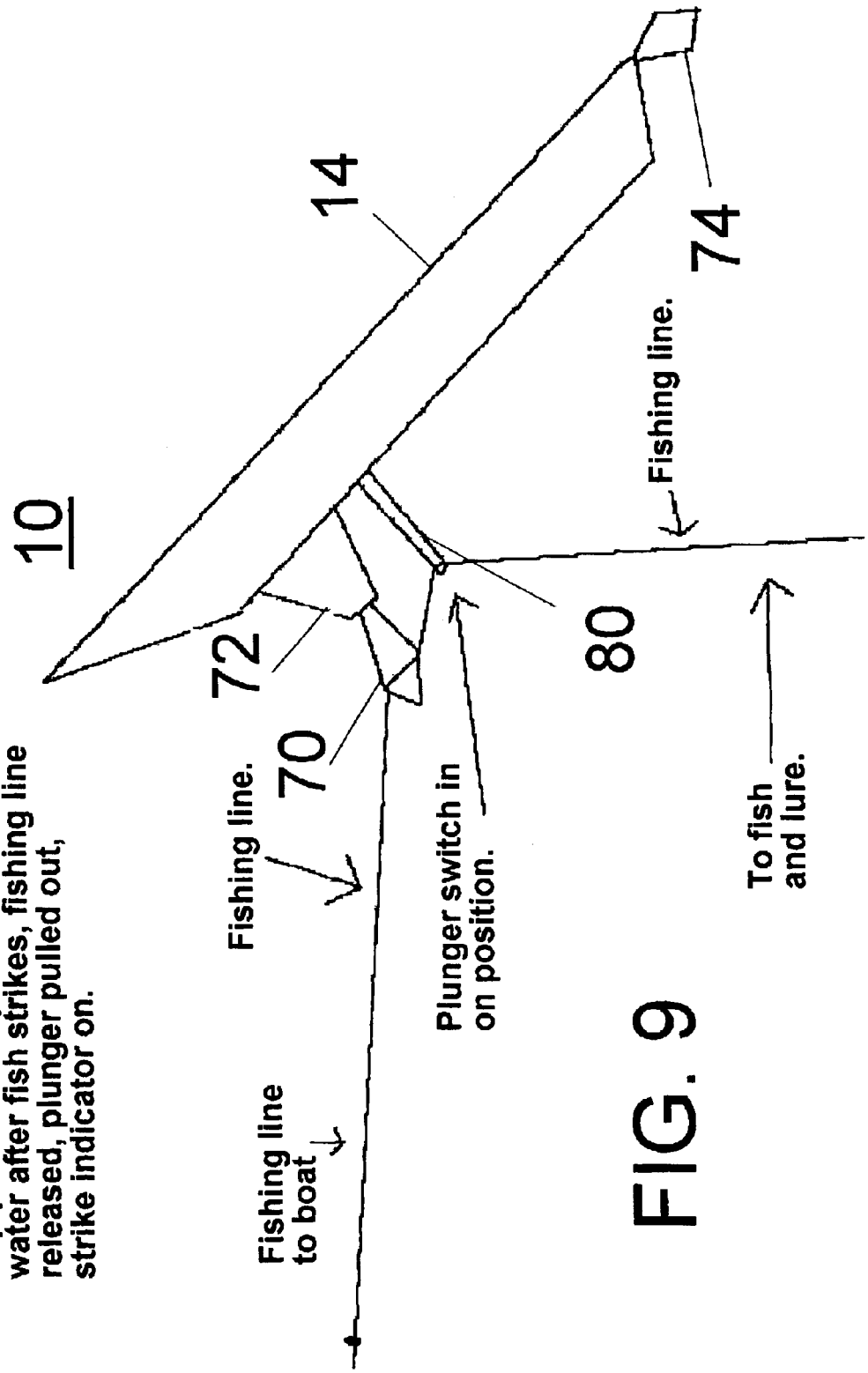
FIG. 9 is a schematic plan view of a fishing line attached to the planer after a fish strikes and the fishing line has been released from release 74.

As seen in FIGS. 1–3 and in FIGS. 8 and 9, first fishing line release 70 is attached to inboard surface 16 of planar board casing 12 by linking member 72 and is structurally identical to second fishing line release 74, which is attached to back end surface 13 of planar board casing 12 by linking member 76. Novel fishing line release 40 is illustrated in FIGS. 4a–4e. FIG. 4a is a perspective view of release 40 as it appears ready to use.

Fishing line release 40 comprises three separate and unique parts: first clamping jaw 41, second clamping jaw 43, and moveable clamping collar 44. Except for each clamping jaw having a complementary mating part of snap-like fitting attachment member with spring action tab closure 42 on the distal end of its inside surface, the inner surfaces of first clamping jaw 41 and second clamping jaw 43 would be mirror images of each other. To assemble the three parts of release 40; first complementary part of snap tab 42, on the distal end of the inner surface of first clamping jaw 41 (the inner surface is that side of first clamping jaw 41 that is opposite to the side fitted with button stop 49), is fitted to the second complementary part of snap tab 42 that is located on the inner surface of second clamping jaw 43. The molded shape of the two damping jaws ensures that when the jaws are snapped together at their distal ends, as just described, their proximal ends are biased to maintain a separation distance referred to as space 48 through which a fishing line is threaded. Space 48 is best seen is FIGS. 4c and 4d. To ensure that the release is firmly clamped about the fishing line, moveable clamping collar 44 is placed about the clamping jaws starting from the distal end and moved toward the proximal end until it reaches the button stop.

So that the fishing line release does not prematurely release the fishing line, the fishing line can be more securely attached to the fishing release in the following manner. After the fishing line is threaded through space 48, the line may be wrapped about the proximal end of the release and inserted into grooves 45 and 47 located on the first clamping jaw and then into grooves 55 and 57 located on the second clamping jaws (see grooves illustrated in FIGS. 4b, 4c, and 4e).

Figure 5:
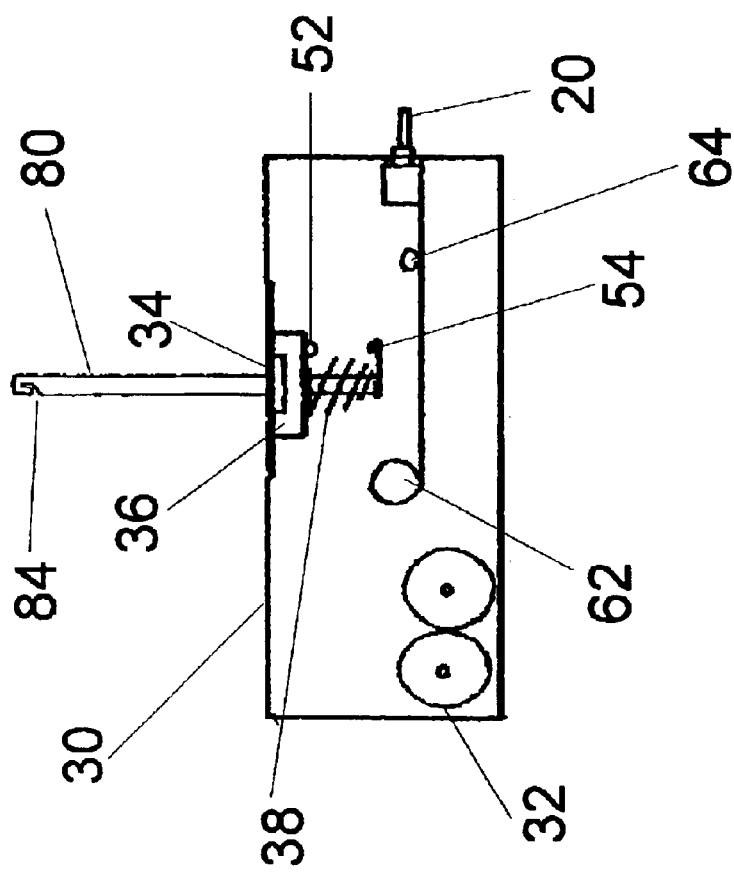
FIG. 5 is a cross-sectional view (viewed from tapered end of planer) of the batteries and lights inside enclosure 22 as illustrated in FIG. 2.

The arrangement of the electrical elements in water-tight chamber 30 are shown in cross-section in FIG. 5. The power source, in the embodiment shown, is from a pair of batteries 32. The on and off status of light 64 is controlled by light switch 20. Plunger 80 is positioned to be partly inside the water-tight compartment and partly outside of the compartment so that crochet-like hook 84 that is located on the end of plunger 80 extends out from water-tight compartment 30 to project out from the inboard side of the planer proximate to fishing line release 70. Crochet-like hook 84 provides the means to connect a fishing line to the plunger. Spring 38 and second contact 54 are fixed to the end of plunger 80 that is secure inside water-tight compartment 30. Spring 38 biases second contact 54 away from first contact 52 fixed to sealing rim 36. Inside sealing rim 36 is water-tight seal 34, in the embodiment shown, seal 34 is an o-ring.

When a fish strikes the fishing line is released from line release 74 but remains attached to crochet-like hook 84 of plunger 80 and to line release 70 so that the pull of the fish on the line pulls plunger 80 further out of the water-tight compartment causing second contact 54 to come into contact with first contact 52 providing for the circuit to close (see idealized wiring scheme shown in FIG. 7) which allows current to power blinking light 62. In the embodiment shown, blinking light 62 is the strike indicator, indicating that a fish has taken the bait. The blinking light can be seen in daylight or dark. It should be understood that the strike indicator could take many forms, such as a pulsating strobe light or an audio effect.

Figure 6:
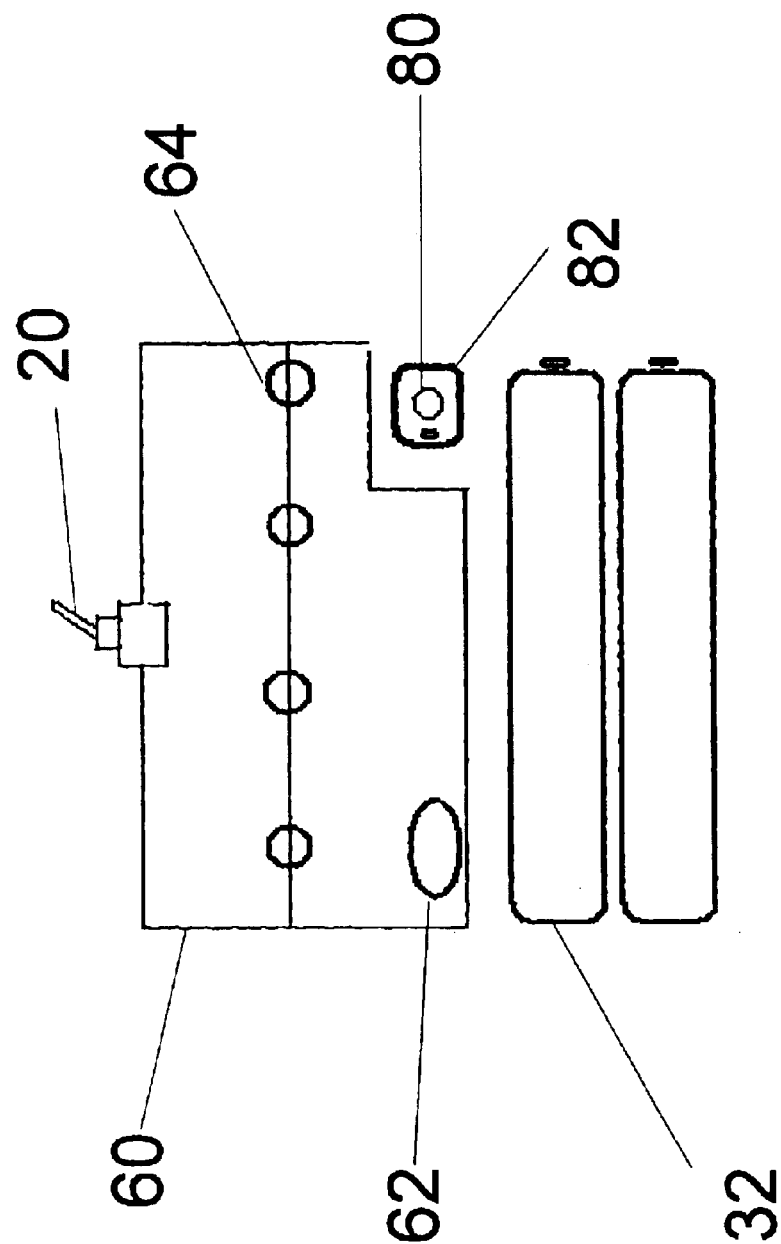
FIG. 6 is a cross-sectional view (viewed from the front side of the planer) of batteries and lights inside enclosure 22 as illustrated in FIG. 2.
Figure 7:
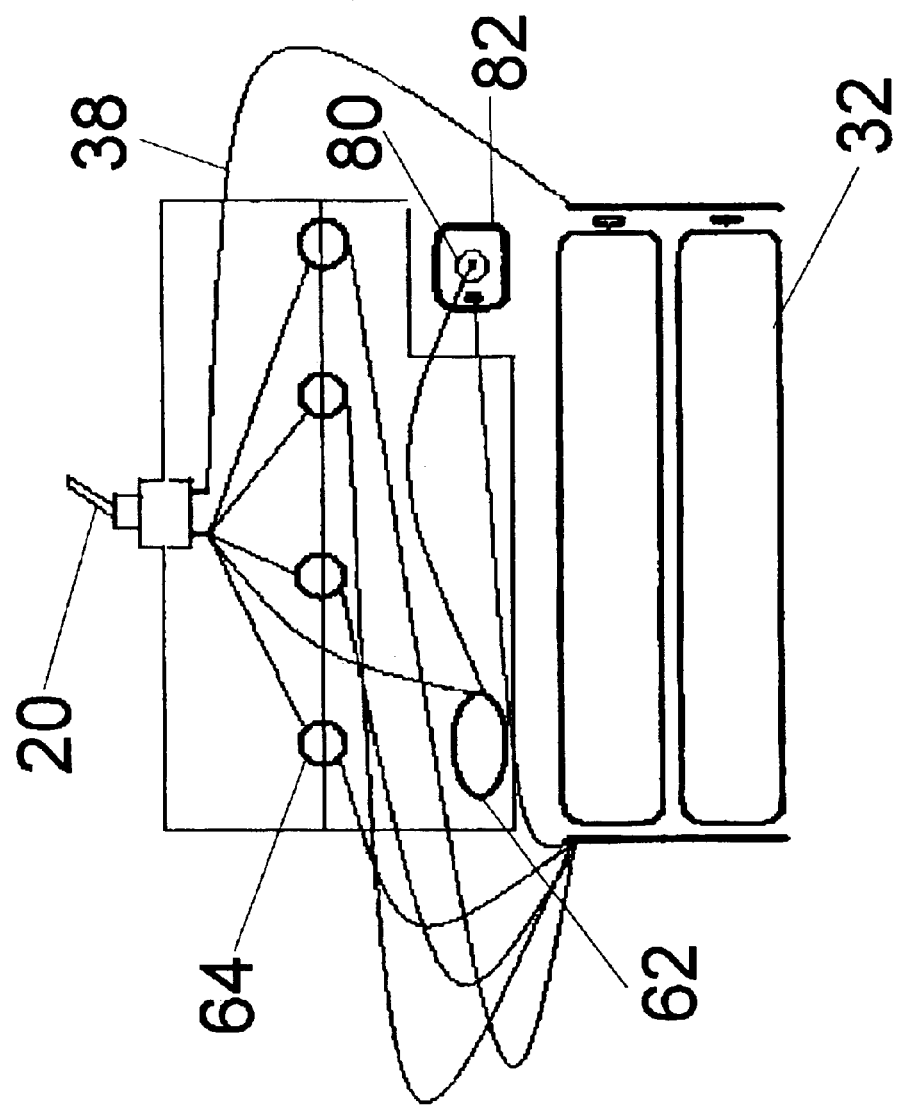
FIG. 7 is a schematic cross-sectional view of the connections between the switch, lights, and batteries as shown in FIGS. 5 and 6 (viewed from front side of planer).

FIG. 6 shows an arrangement of the electrical elements in cross-section. In the embodiment illustrated in FIG. 6, it can be seen that night illumination is provided by four lights 64 that, as is illustrated in FIG. 7, are connected in parallel to reduce the risk of all the lights going out at the same time.

FIGS. 8 and 9 show, schematically, how the strike indicator of trolling assembly 10 is used to indicate when a fish is striking. In FIG. 8 illustrates how to rig a fishing line to the board of this invention to tow trolling assembly 10. This is done by having the line from the boat clamped first to release 70. Looping the clamped fishing line through the four grooves on the release (as described above) after it is threaded through the space between the clamping jaws will keep the line from slipping. The line is then attached to the crochet-like hook of plunger 80 and then clamped to release 74.

FIG. 9 illustrates how the trolling assembly reacts when a fish strikes. When a fish pulls on the fishing line, line release 74 will release the fishing line so the planer board reorients. The fishing line remains attached to plunger 80 and, if desired, to release 70. After the fishing line is released from release 74, the pull on the line pulls plunger 80 opposite to how it is biased by the spring that is attached to the end of the plunger that is located inside the water-tight compartment. The taut fishing line pulls the plunger further out from the water-tight compartment through the inboard side of planer board forcing contacts 52 and 54 together creating the closed circuit that activates the blinking light strike indicator. If the fishing line is kept attached to release 70, the trolling assembly can easily be pulled in with the catch.

The foregoing description, for purposes of explanation, used specific and defined nomenclature to provide a thorough understanding of the invention. However, it will be apparent to one skilled in the art that the specific details are not required in order to practice the invention. Thus, the foregoing descriptions of the specific embodiment of the lighted trolling planer board with strike indicator are presented for purposes of illustration and description. They are not intended to be exhaustive or to limit the invention to the precise forms disclosed. Those skilled in the art will recognize that many changes may be made to the features, embodiments, and methods of making the embodiments of the invention described herein without departing from the spirit and scope of the invention. Furthermore, the present invention is not limited to the described methods, embodiments, features or combinations of features but include all the variation, methods, modifications, and combinations of features within the scope of the appended claims such as the number and kind of lights used for night fishing, the shape and size of the planer board, the materials from which the board is made, the number of compartment in the hollow space of the board, more or less hollow space in the board casing, and the particular means used to indicate a strike, to name just a few examples. The invention is limited only by the claims.

What is claimed is:

1. A trolling assembly comprising:
   i) a buoyant planer board having at least one watertight compartment;
   ii) at least one fishing line release extending from said planer board for the purpose of holding a fishing line;
   iii) a strike indicator;
   iv) a power source housed in said watertight compartment providing power to the strike indicator; and
   v) an activation means operatively connected to said fishing line and to said power source for the purpose of activating said strike indicator when a fish strikes, wherein said activation means further comprises:
   i) a plunger means;
   ii) a first end of said plunger means;
   iii) a second end of said plunger means;
   with said first end of said plunger projecting out from said watertight compartment proximate to said at least one fishing line release and operatively connected to a fishing line, with said second end of said plunger projecting into said watertight compartment of said planer board;
   iv) a first electrical contact;
   v) a second electrical contact;
   vi) a biasing means operatively connected to said plunger to bias said first and second electrical contacts apart, wherein when a fish strikes said fishing line release releases said fishing line exerting a pulling pressure on said plunger against the bias of the biasing means connecting said first and second electrical contacts activating said strike indicator.

2. The trolling assembly, as recited in claim 1, further comprising a second fishing line release extending from said planer board for positively retaining the trolling assembly to a fishing boat.

3. The trolling assembly as recited in claim 1, wherein said planer board is translucent.

4. The trolling assembly as recited in claim 1, wherein said planer board comprises at least one light for providing for light for fishing at night.

5. The trolling assembly as recited in claim 1, wherein said strike indicator further comprises a blinking light.

6. The trolling assembly as recited in claim 1, wherein said strike indicator further comprises an audio device.

7. The trolling assembly as recited in claim 1, wherein said strike indicator further comprises a strobe light.

8. The trolling assembly, as recited in claim 1, wherein said planer board further comprises:

i) an inboard surface, and ii) a longitudinal lower surface where an edge formed by the conjunction of the inboard surface and the longitudinal lower surface is shaped to a hydrodynamic curved edge to direct water flow beneath the board.

9. The trolling assembly, as recited in claim 1, wherein said planar board further comprises a hollow casing wherein said hollow casing further comprises at least one compartment.

10. The trolling assembly, as recited in claim 9, wherein the at least one compartment of said hollow space of said planar board is a watertight compartment.

11. The trolling assembly, as recited in claim 9, wherein one compartment of said hollow space of said planar board contains buoyant material increasing the buoyancy of the planar board.

12. The trolling assembly, as recited in claim 1, wherein said planar board further comprises a second compartment.

13. The trolling assembly, as recited in claim 1, further comprising a fin integral with said planar board.

14. The trolling assembly, as recited in claim 13, wherein the fin is integrally molded with said planer board.

15. The trolling assembly, as recited in claim 13, wherein the fin is fixedly attached to said planer board.

* * * * *